United States Patent [19]

Adachi et al.

[11] Patent Number: 5,043,117

[45] Date of Patent: Aug. 27, 1991

[54] METHOD OF MANUFACTURING CERAMIC PRODUCTS, AND A METHOD OF MANUFACTURING CERAMIC SPRINGS

[75] Inventors: Takaji Adachi, Yokohama; Masahiko Nakatani, Yokosuka; Shigemi Sato; Toyoyuki Higashino, both of Yokohama; Suguru Nomura, Komagane; Ryusuke Adachi, Yokohama, all of Japan

[73] Assignee: NHK Spring Co., Ltd., Yokohama, Japan

[21] Appl. No.: 262,522

[22] Filed: Oct. 25, 1988

[30] Foreign Application Priority Data

Oct. 26, 1987 [JP] Japan ................. 62-268333

[51] Int. Cl.$^5$ .................. C04B 33/32; C04B 38/04
[52] U.S. Cl. .................. 264/63; 264/119; 264/344
[58] Field of Search ............ 264/63, 285, 339, 295, 264/344, 177.11, 211.11, 119

[56] References Cited

U.S. PATENT DOCUMENTS 2,939,199 6/1960 Strivens .................. 264/63
4,104,345 8/1978 Anderson et al. .

FOREIGN PATENT DOCUMENTS 58-178032 10/1983 Japan .
60-54966 3/1985 Japan ................... 264/63
61-88033 5/1986 Japan .
62-7659 1/1987 Japan .
62-25013 2/1987 Japan .
62-242144 10/1987 Japan .
1-110909 4/1989 Japan .

Primary Examiner—James Derrington
Attorney, Agent, or Firm—Frishauf, Holtz, Goodman & Woodward

[57] ABSTRACT

A method of manufacturing ceramic products. This method comprises the steps of mixing ceramic powder, organic materials imparting formability to the ceramic powder, and a first solvent, thereby preparing a mixture, shaping the mixture thereby forming a product of a simple shape, drying the product, immersing the dried product in a bath of a second solvent, thereby plasticizing the product, and re-shaping the plasticized product.

15 Claims, 6 Drawing Sheets

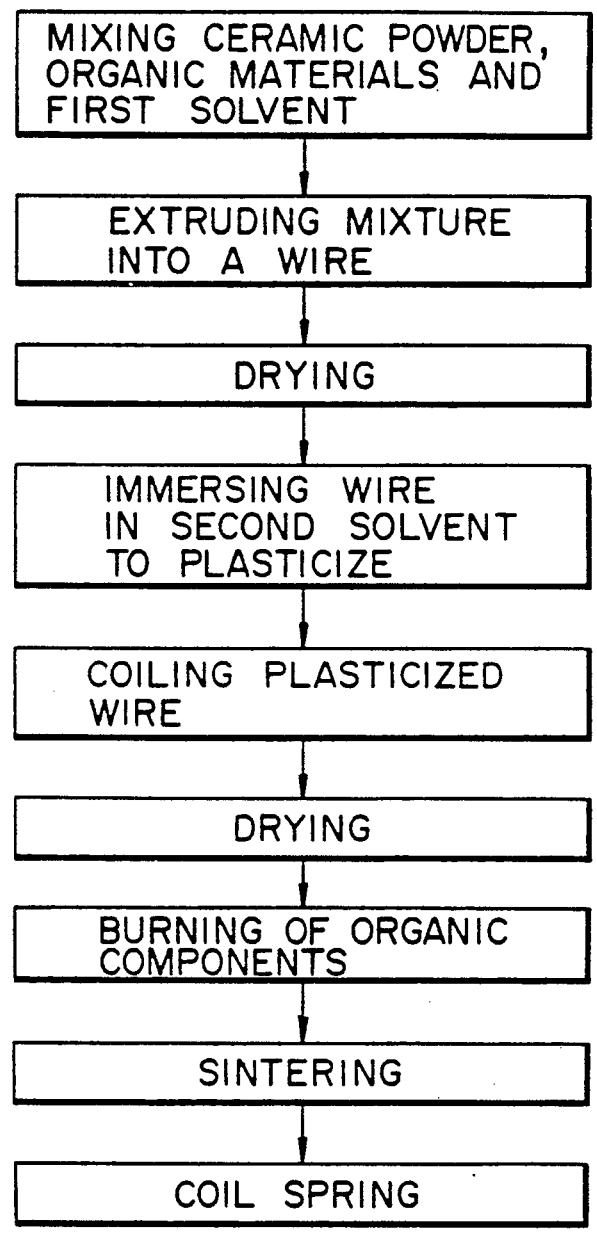
F I G. 2
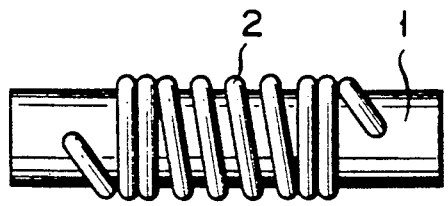
F I G. 3

METHOD OF MANUFACTURING CERAMIC PRODUCTS, AND A METHOD OF MANUFACTURING CERAMIC SPRINGS

BACKGROUND OF THE INVENTION

1. Field of the Invention

The present invention relates to a method of manufacturing ceramic products, and also to a method of manufacturing ceramic springs.

2. Description of the Related Art

Ceramic products are greatly resistant to heat, corrosion, and wearing. However, sintered ceramic products scarcely undergo plastic deformation. They are hard and brittle, and are extremely difficult to machine. Hence, when sintered ceramic bodies are machined into products of desired shaped, the resultant product will inevitably be expensive due to the cost of machining the sintered ceramic bodies.

To manufacture ceramic products at low cost, ceramic bodies should be machined as little as possible once they have been sintered. To this end, a mixture of ceramic materials are first shaped, or shaped and calcined, and then machined.

Various methods of shaping ceramic materials have been used, in accordance with the mechanical and physical properties which ceramic products should have, and also in accordance with the cost at which the products should be made. Among these methods are: slip casting, die pressing, isostatic molding, injection molding, extruding, and doctor-blade method.

Die pressing is advantageous in two respects. First, it can make shaped products greatly precise in size. Secondly, it can manufacture shaped products with a high efficiency, and thus is suitable for mass production. However, die pressing is accompanied with several problems: (i) the shaped products by this method are likely to fail to have a uniform density; (ii) the method requires very hard dies; (iii) the dies required in the method are very expensive; and (iv) a high pressure must be applied in this method.

Isostatic molding is advantageous in two respects. First, a pressure is applied on a ceramic mixture body uniformly, and the resultant shaped products can cardly fail to have a uniform density. Secondly, rubber molds, which are inexpensive, can suffice. Isostatic pressing is, however, disadvantageous in that the shaped products have rough surfaces, unlike those made by die pressing, and must be subjected to machining.

SUMMARY OF THE INVENTION

It is the object of the present invention to provide a method of manufacturing ceramic products which are uniform in physical properties and precise in size, with a high efficiency at low cost, in particular a method of manufacturing various types of ceramic products, each type in a small quantity, such as ceramic springs having relatively complex shapes.

According to the invention, there is provided a method of manufacturing ceramic products, which comprises the steps of:

mixing ceramic powder, organic materials imparting formability to the ceramic powder, and a first solvent, thereby preparing a mixture;
shaping the mixture, thereby forming a product of a simple shape;
drying the product;
immersing the dried product in a bath of a second solvent, thereby plasticizing the product; and
re-shaping the plasticized product.

Further, according to the invention, there is provided a method of manufacturing a ceramic coil spring which comprises the steps of:

mixing ceramic powder, organic materials imparting formability to the ceramic powder, and a first solvent, thereby preparing a mixture;
extruding the mixture into a wire;
drying the wire;
immersing the dried wire in a bath of a second solvent, thereby plasticizing the wire; and
coiling the plasticized wire.

Moreover, according to the invention, there is provided a method of manufacturing a ceramic coned disk or leaf spring, which comprises the steps of:

mixing ceramic powder, organic materials imparting formability to the ceramic powder, and a first solvent, thereby preparing a mixture;
shaping the mixture into a sheet-like product;
drying the sheet-like produce;
immersing the dried sheet-like product in a bath of a second solvent, thereby plasticizing the sheet-like product; and
shaping the plasticized sheet-like product into a coned disk or leaf spring.

DETAILED DESCRIPTION OF THE INVENTION

The methods according to the present invention will now be described in detail. These methods may be generally represented in FIG. 1.

The ceramic powder, which is used in the invention as the starting material, may be either an oxide ceramic or a non-oxide ceramic.

The organic materials, which are added to the ceramic powder, are those which impart plasticity and shape-sustaining property to the ceramic powder which is non-plastic, and which will be decomposed and removed from a re-shaped product while the re-shaped product is being burnt and, hence, will not remain in the sintered ceramic product. These organic materials are a binder, a plasticizer, a dispersing agent, and the like. They are known to perform the following functions. The binder renders a shaped product sufficiently strong. The plasticizer makes the ceramic mixture plastic and soft. The dispersing agent disperses, in a first solvent, the other organic materials mixed with the ceramic powder, so as to reduce the necessary amount of the solvent which must be used to dissolve these organic materials.

The binder used in this invention is either one which can be dissolved by water, such as methylcellulose, polyvinyl alcohol, water-soluble urethane, or a copolymer of polymethacrylate. Alternatively, it can be one which can be dissolved by an organic solvent, such as polyvinyl butyral, polyacrylate, or polymethacrylate.

The first solvent, which is used in the present invention, is preferably such one as will dissolve the organic materials which impart formability to the ceramic powder, whereby the organic materials thoroughly mix with the ceramic powder.

According to the present invention, the ceramic powder, the organic materials, and a first solvent are mixed in a predetermined ratio, thereby preparing a mixture. Then, the mixture is shaped by means of extruding or doctor-blade method etc., thereby forming a product of a comparatively simple shape, such as a sheet or a wire. These shaped products are dried, thus removing the first solvent from the shaped products and also causing the products an adequate drying shrinkage. The shaped product, which has undergone dry-shrinking, can hardly be plastic.

The second solvent used in the invention is one which can soften the binder but is a poor solvent to the binder, and can yet dissolve the plastic components of the mixture, i.e., the plasticizer, the dispersing agent, and the low-molecular component of the binder. Preferably, the second solvent is such one as has a small surface tension, readily wets the shaped product, and evaporates from the surface of the product at controlled speed. Several solvents can be used as the second solvent, among which are: alcohol, ketone, aromatic hydrocarbon, aliphatic hydrocarbon, alycrylic hydrocarbon, chlorinated hydrocarbon. These solvents may be used either singly or in combination. Nonetheless, it is desirable that a mixture of two or more of these solvents be used as the second solvent. When a mixture solvent is used, it is easier of control the speed at which the second solvent evaporates from the surface of the re-shaped product. The selection of the second solvent largely depends on what is used as the binder.

When the shaped product of a simple shape is immersed in the second solvent, the solvent will enter the product through pores formed in the surface region of the product. The interparticle solvent and the solvent adsorbed to the surfaces of the ceramic particles renders the product sufficiently plastic. The second solvent also softens the binder, thereby plasticizing the product. Since the shaped product possesses an adequate plasticity once it has been immersed in the second solvent, it can be successfully re-shaped, even if it is a thin sheet or a slender wire, into a product having a precise size.

The second solvent is evaporated from the re-shaped product, thereby drying the product. During the drying process, the re-shaped product inevitably shrinks. However, the dry-shrinkage is negligible, since the second solvent is a poor solvent to the binder, that is, a fractional amount of the solvent is contained in the binder. In addition, the re-shaped product long maintains its shape since the plastic components have been extracted from the shaped product being immersed in the second solvent. Hence, the finished ceramic product has a great dimensional precision.

In the case where die pressing is employed to re-shape the plasticized product, there is no need to apply a high pressure on the product, or to use a very hard die. Furthermore, the shaped products which have simple shaped can be stored in a fully dried condition, so that they can be re-shaped into any desired shapes at any time required.

BRIEF DESCRIPTION OF THE DRAWINGS

FIG. 2 is a block diagram illustrating a method of manufacturing ceramic coil springs, in accordance with a first embodiment of the present invention;

FIG. 3 is a diagram explaining how a ceramic coil spring is made by the method shown in FIG. 2;

DETAILED DESCRIPTION OF THE PREFERRED EMBODIMENTS

Figure 1:
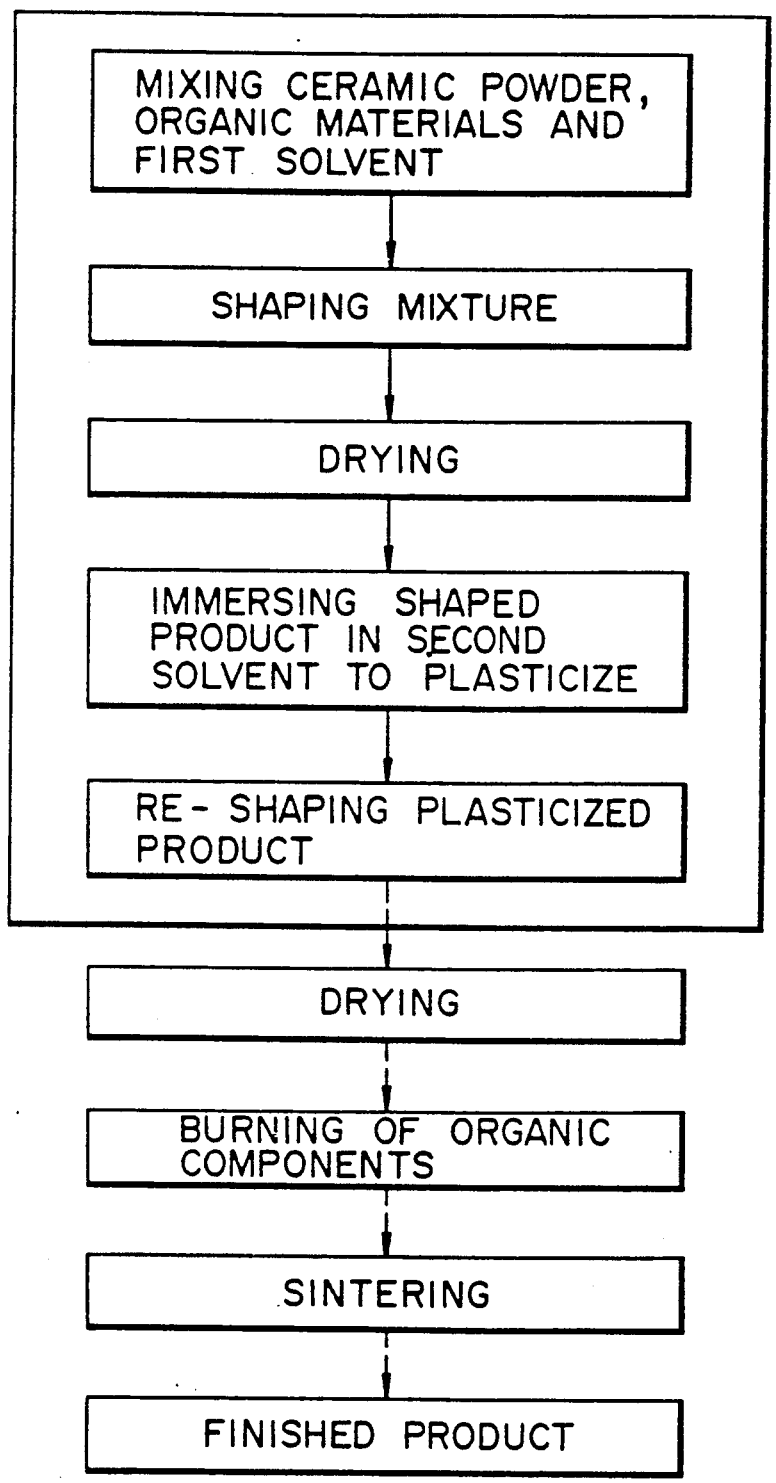
FIG. 1 is a block diagram explaining a method of manufacturing ceramic products, in accordance with this invention.

The present invention will now be described in detail, with reference to some embodiments. Nonetheless, the invention is not limited to these embodiments.

EXAMPLE 1

Ceramic coil springs were manufactured by the method shown in FIG. 2. First, 100 parts by weight of partially stabilized zerconia, 4 parts by weight of methylcellulose, 4 parts by weight of polyethylene grycol (number average molecular weight: 400), 4 parts by weight of glycerin, 0.5 parts by weight of polycarbonate ammonium salt, and 16 parts of weight of water (used as the first solvent) were mixed together, thus preparing a mixture. Then, the mixture was shaped into wires having a diameter of 0.55 mm by means of an extruder. These wires were dried until they shrinked completely to have their diameter reduced to 0.52 mm. Thereafter, the dry-shrinked wires were kept immersed for one minutes or more in a bath of a mixture solvent (used as the second solvent) consisting of 50 vol % of ethyl alcohol and 50 vol % of isopropyl alcohol. As a result, the wires became plastic. Then, as is shown in FIG. 3, watch wire 2 was wound around core rod 1, re-shaped into a coil having an average diameter of 10.0 mm, a length of 11 mm, and eight turns of which six are effective turns. Further, wire 2, now in the form of a coil, was dried, thus removing the second solvent from it. Wire 2 was removed from core rod 1. The organic components contained in the coil were burnt and removed from the coil. The coil was then sintered, thus manufacturing a ceramic coil spring.

In this method, each coil shrinked but very little after the second solvent had been removed from it. Furthermore, since the plastic components were dissolved from the wires into the second solvent while wires were being immersed in the second solvent, the coils made of these wires retained their shapes well even after the drying process. Therefore, the difference in size among the finished ceramic coil springs was sufficiently small. As a result, ceramic coil springs were manufactured with a very high yield.

A method of manufacturing ceramic coil springs is known, as is disclosed in Japanese Patent Disclosure No. 62-7659. In this method, ceramic powder, methylcellulose, a surfactant, polyhydric alcohol, and water are mixed, thus preparing a mixture. The mixture is shaped into wires by extruding. Each wire is coiled, after its moisture content has been adjusted. The coil made of the wire is dried and sintered, thereby manufacturing a ceramic coil spring. The inventors performed this conventional method, thus manufacturing ceramic coil springs. They found that the coils shrinked very much during the drying process, and were considerably different in size from one another. Consequently, the yield was low. Further, the coils failed to retain their shape sufficiently, and it was necessary to sinter the coils, while keeping them wound around the core rods.

In Example 1, wires 2 were wound around core rods 1, and thus re-shaped into coils. Instead, they can be coiled by means of a latche-type coiling machine.

EXAMPLE 2

Figure 4:
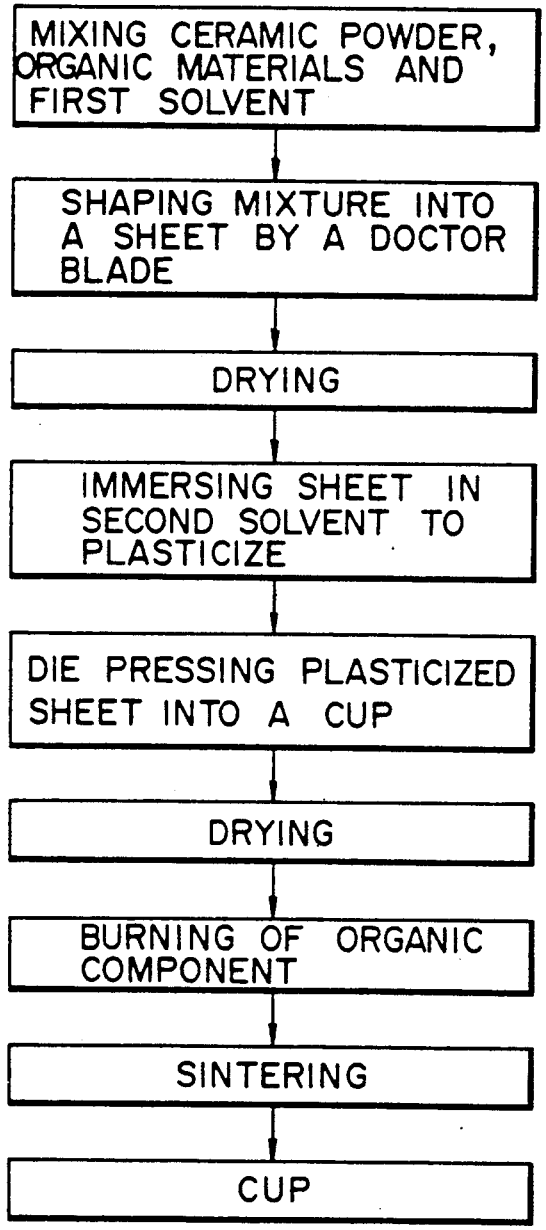
FIG. 4 is a block diagram illustrating a method of manufacturing ceramic cups, in accordance with a second embodiment of this invention.
Figure 5A:
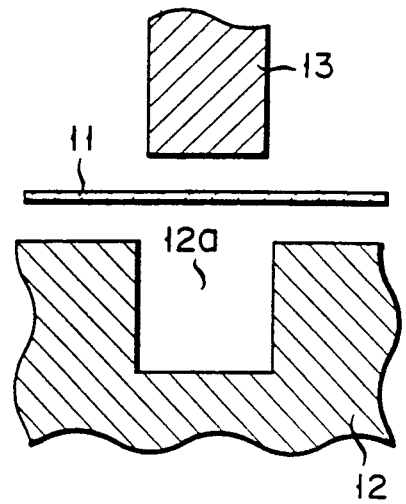
FIG. 5A to 5C are diagrams explaining how a ceramic cup is made by the method shown in FIG. 4.
Figure 5B:
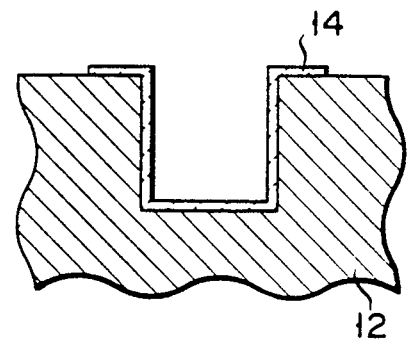
Figure 5C:
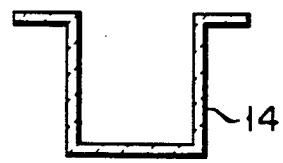

Ceramic cups were manufactured by the method illustrated in FIG. 4. First, 100 parts by weight of alumina, 4 parts by weight of copolymer of polyacrylate, 4 parts by weight of polyethylene glycol (number average molecular weight: 400), 0.5 parts by weight of polycarbonate ammonium salt, and 54 parts of weight of water (used as the first solvent) were mixed, thus preparing a mixture. Then, the mixture was shaped into 1.0 mm-thick sheets by means of doctor-blade method. These sheets were dried until they shrinked completely to have their thickness reduced to 0.6 mm. Thereafter, the dry-shrinked sheets were kept immersed for one minutes or more in a bath of a mixture solvent (used as the second solvent) consisting of 50 vol % ethyl alcohol and 50 vol % of isopropyl alcohol. As a result, the sheets became plastic. Then, as is shown in FIGS. 5A to 5C, each sheet was re-shaped by means of die pressing, into cups 14. More specifically, sheet 11, which had been immersed in the second solvent, was placed on die 12 having recess 12a, then pressed with punch 13 shaped complemental to recess 12a, and thus re-shaped into cup 14. Finally, cup 14 was removed from die 12. Thereafter, cup 14 was dried, thus removing the second solvent from it. The organic components contained in the cup 14 were burnt and removed from the cup 14. The cup 14 was sintered, thus manufacturing a ceramic cup.

For a comparative purpose, the same materials as had been used in Example 2 were mixed in the same ratio as in Example 2, thus preparing a mixture, this mixture was shaped by the doctor-blade method, into sheets of the same thickness as in Example 2, and the moisture content of these sheets was adjusted as in the conventional method. These sheets was re-shaped into cups by means of die pressing. The cups were dried, and shrinked so much that cracks were made in the cups.

Also, for a comparative purpose, the same materials as had been used in Example 2 were mixed in the same ratio as in Example 2, thus preparing a mixture. The mixture was subjected to slip casting, into cups. The slip casting failed to shape cups, whose wall thicknesses were 1 mm or less.

EXAMPLE 3

Figure 6:
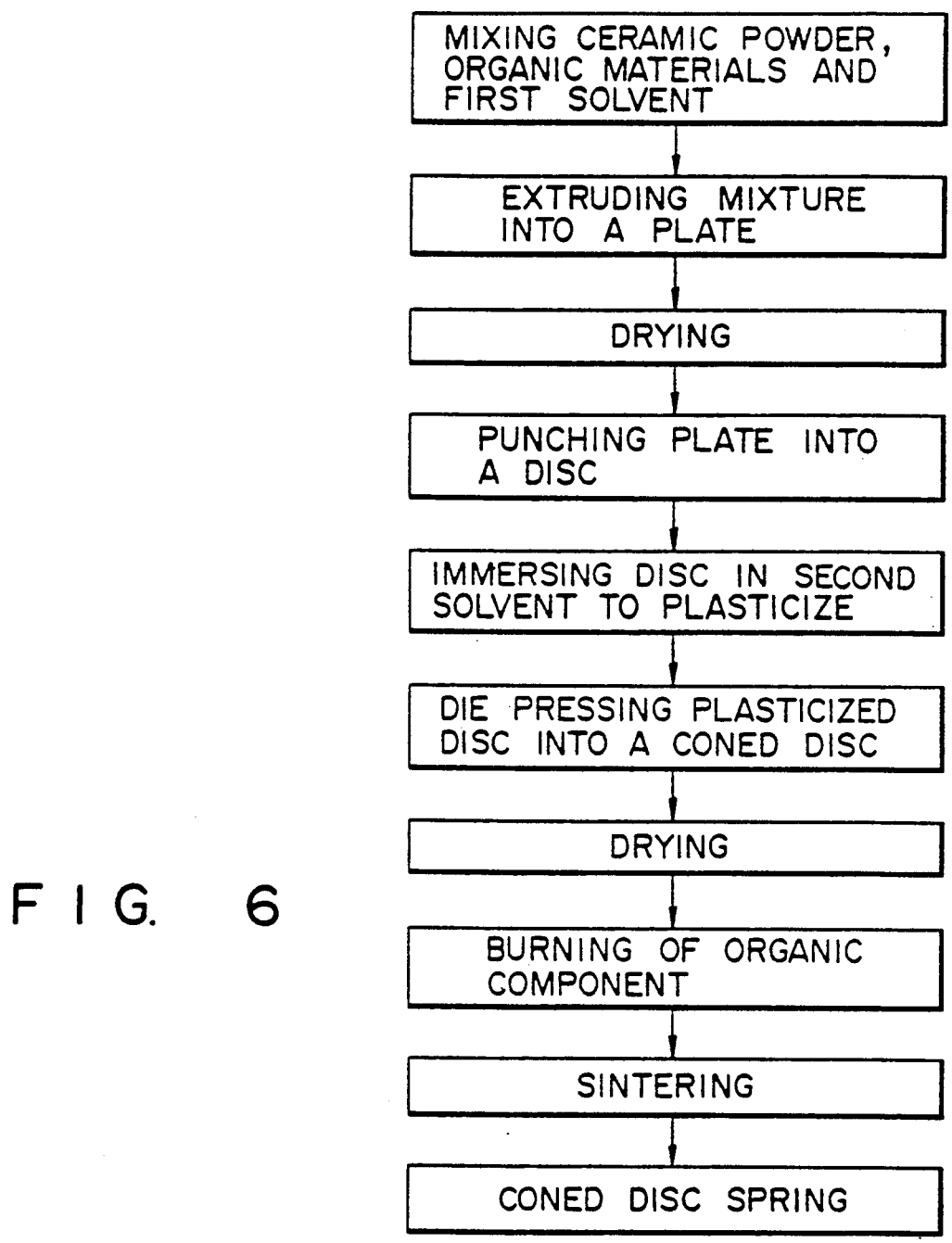
FIG. 6 is a block diagram illustrating a method of manufacturing ceramic coned disk springs, in accordance with a third embodiment of this invention.
Figure 7:
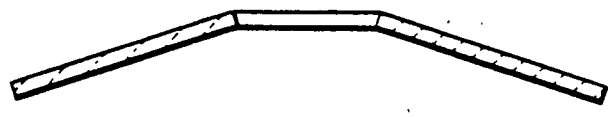
FIG. 7 is a sectional view showing the ceramic coned disk spring made by the method shown in FIG. 6.

Ceramic coned disk springs were manufactured by the method illustrated in FIG. 6. First, the same materials as those used in Example 1 were mixed in the same ratio as in Example 1, thus preparing a mixture. Then, the mixture was shaped by means of an extruder, into plates having a width of 50 mm and a thickness of 1 mm. These plates were dried until they shrinked completely. The plates were than punched, whereby disks having an outside diameter of 40 mm and an inside diameter of 30 mm were made. These disks were immersed in a bath of mixture solvent (used as the second solvent) consisting of 50 vol % of isopropyl alcohol and 50 vol % of trichloroethylene. As a result, the disks become plastic. Then, each disk was re-shaped into a cone disk by means of die pressing. The coned disk was dried. The organic components were burnt and removed from the coned disk. The coned disk was sintered at 1450° C., thus manufacturing a ceramic coned disk spring, as is illustrated in FIG. 7 having a thickness of 0.75 mm, and outer diameter of 30 mm, an inner hole of 22.5 mm diameter and a cone height of 1.8 mm.

For a comparative purpose, the same mixture as had been prepared in Example 1 was pelletized, and then subjected to die pressing as in the conventional method, thus shaping it directly into coned disks. It was found that no coned disks having a thickness of 1 mm or less could by shaped by this method.

In Example 3, the plates were punched, thereby shaping disks, these disks were immersed in the second solvent, and they were re-shaped into coned disks. Instead, the plates can be immersed in the second solvent, and then punched, thus re-shaping disks, which were simultaneously re-shaped into coned disks.

Leaf springs of various shaped can be manufactured by the same method as Example 3.

EXAMPLE 4

Figure 8:
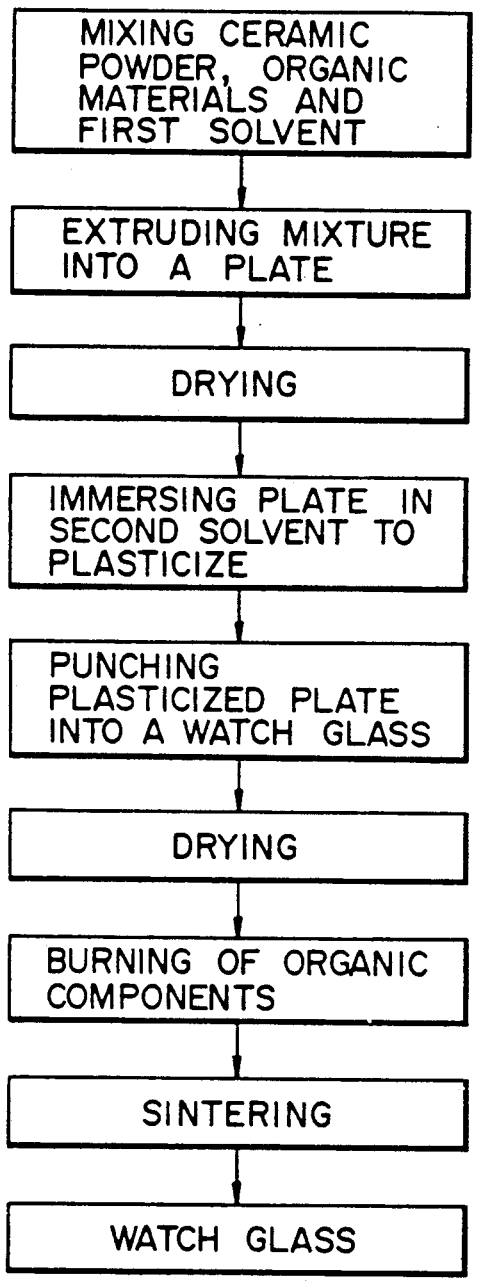
FIG. 8 is a block diagram showing a method of manufacturing ceramic watch glasses, in accordance with a fourth embodiment of the present invention.
Figure 9A:
FIGS. 9A and 9B are a sectional view and a plan view, respectively, showing the ceramic watch glass manufactured by the method illustrated in FIG. 8.
Figure 9B:
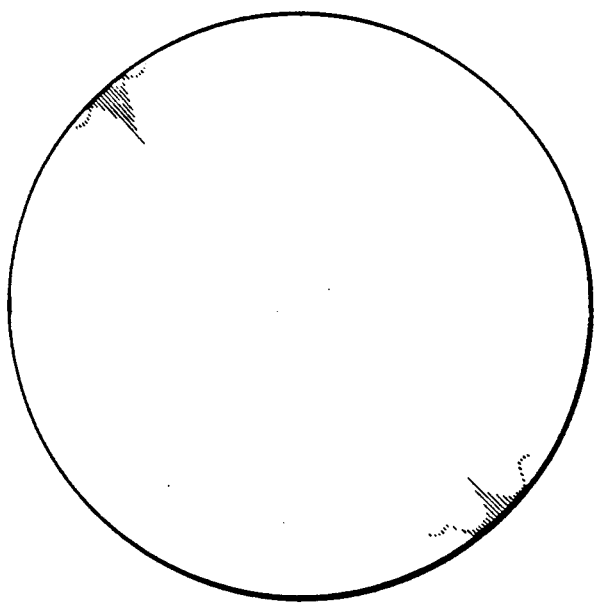

Watch glasses were manufactured by the method illustrated in FIG. 8. First, the same materials as those used in Example 1 were mixed in the same ratio as in Example 1, thus preparing a mixture. Then, the mixture was shaped by means of an extruder, into plates having a width of 50 mm and a thickness of 2 mm. These plates were dried until they shrinked completely. The plates were immersed n a bath of a mixture solvent (used as the second solvent) consisting of 50 vol % of ethyl alcohol and 50 vol % of trichloroethylen. As a result, the plates become plastic. Then, each plate was re-shaped into a watch glass by means of die pressing. The watch glass was dried. The organic components contained in the watch glass were burnt and removed from the watch glass. The watch glass was sintered at 1450° C., thus manufacturing a ceramic watch glass, as is shown in FIGS. 9A and 9B. The watch glass of FIGS. 9A and 9B has a thickness of 2 mm, a diameter of 40 mm and a done height of 8 mm. The watch glass was not distorted in the sintering process, and the yield was sufficiently high.

For a comparative purpose, the same mixture as had been prepared in Example 1 was pelletized, and the subjected to die pressing as in the conventional method, thus shaping it directly into watch glasses. It was found that the shaped products obtained by the die pressing exhibited a non-uniform density, and were deformed when they were sintered. No watch glasses having the desired shape could by manufactured.

EXAMPLE 5

Figure 10:
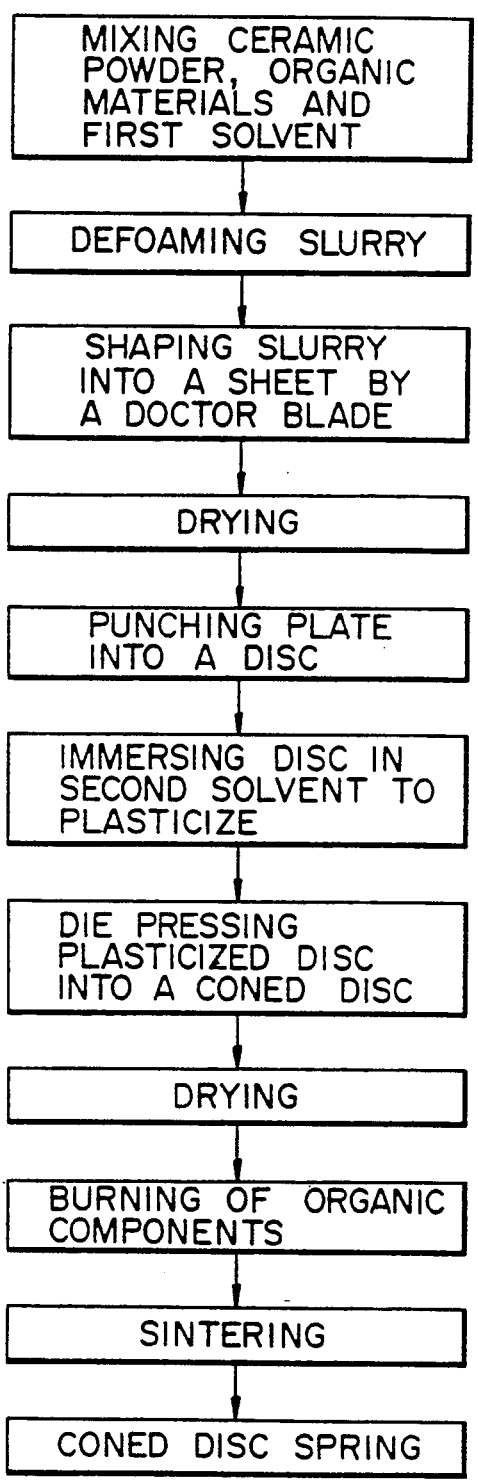
FIG. 10 is a block diagram explaining a method of manufacturing ceramic coned disk springs, according to a fifth embodiment of the invention.
Figure 11:
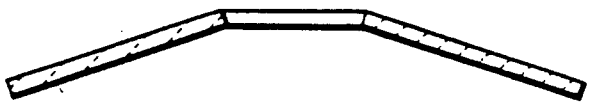
FIG. 11 is a sectional view, showing the ceramic coned disk spring manufactured by the method shown in FIG. 10.

Coned disk springs were manufactured by the method shown in FIG. 10. First, 100 parts by weight of alumina, 7 parts by weight of polyvinyl alcohol, 4 parts by weight of polyethylene glycol (number average molecular weight: 400), 3 parts by weight of butylbenzyl phthalate, 0.5 parts by weight of polycarbonate ammonium salt, 2 parts by weight of wax-based emulsion (used as a defoaming agent), and 60 parts of weight of water (used as the first solvent) were mixed, thus preparing a slurry. Then, the slurry was shaped into sheets by means of doctor-blade method. These sheets were dried until they shrinked completely to have their thickness reduced to 0.6 mm. Thereafter, the sheets were punched, thus shaping disks having an outside diameter of 50 mm and an inside diameter of 40 mm. Then, these disks were immersed in a bath of a mixture solvent (used as the second solvent) consisting of 50 vol % of ethyl alcohol and 50 vol % of trichloroethylene. Hence, the disks became plastic. Then, each disk was re-shaped by means of die pressing, into coned disk. The coned disk was dried. The organic components contained in the conned disk was burnt and removed from the coned disk. The coned disk was sintered at 1600° C., thus manufacturing a ceramic coned disk spring, as is illustrated in FIG. 11.

For a comparative purpose, the same mixture as had been prepared in Example 5 was pelletized, and then subjected to die pressing, thus shaping it directly into coned disks, and these coned disks were dried and sintered, as in the conventional method. It was found that the resultant coned disk springs failed to have the desired shape or size.

The preferred embodiments described above are nothing more than examples of the present invention, and the invention is not limited to these embodiments. Various modifications can be made without departing the scope of the invention.

What is claimed is:

1. A method of manufacturing ceramic products, comprising the steps of:
   preparing a mixture of mixing together ceramic powder, organic materials including at least a binder and a plasticizer for imparting formability to the ceramic powder, and a first solvent;
   shaping the mixture, thereby forming a product of a simple shape;
   drying the product to remove substantially all of the first solvent from the product;
   immersing the dried product in a bath of a second solvent which dissolves a plasticizer contained in the product and which is a poor solvent to the binder so that is softens the binder but does not dissolve the binder, for thereby plasticizing the product;
   re-shaping the plasticized product into a product having a given size and shape; and
   drying the re-shaped product to remove second solvent therefrom whereby shrinkage of the re-shaped product is substantially negligible during the removal of the second solvent.

2. The method according to claim 1, further comprising the steps of:
   burning organic components contained in the re-shaped product, and sintering the re-shaped product.

3. The method according to claim 1, wherein said organic materials further include a dispersing agent.

4. The method according to claim 3, wherein said binder comprises at least one element selected from the group consisting of methylcellulose, polyvinyl alcohol, water-soluble urethane, a copolymer of polymethacrylate, polyvinyl butyral, polyacrylate, and polymethacrylate.

5. The method according to claim 1, wherein said second solvent is an organic solvent selected from the group consisting of alcohol, ketone, aromatic hydrocarbon, aliphatic hydrocarbon, alycrylic hydrocarbon, chlorinated hydrocarbon, or a mixture of at least two of these organic solvents.

6. A method of manufacturing a ceramic coil spring, comprising the steps of:
   preparing a mixture by mixing together ceramic powder, organic materials including at least a binder and a plasticizer for imparting formability to the ceramic powder, and a first solvent;
   extruding the mixture into a wire;
   drying the wire to remove substantially all of the first solvent form the extruded wire;
   immersing the dried wire in a bath of a second solvent which dissolves a plasticizer contained in the wire and which is a poor solvent to the binder so that is softens the binder but does not dissolve the binder, for thereby plasticizing the wire;
   coiling the plasticized wire by winding the plasticized wire around a core rod;
   drying the wire as it is wound around the core rod to remove second solvent therefrom; and then
   removing the coil-shaped dried wire from the core rod.

7. The method according to claim 6, further comprising the steps of:
   burning organic compounds contained in the coil-shaped dried wire, and sintering the coil-shaped dried wire.

8. The method according to claim 6, wherein said organic materials further include a dispersing agent.

9. The method according to claim 8, wherein said binder comprises at least one element selected from the group consisting of methylcellulose, polyvinyl alcohol, water-soluble urethane, a copolymer of polymethacrylate, polyvinyl butyral, polyacrylate, and polymethacrylate.

10. The method according to claim 6, wherein said second solvent is an organic solvent selected from the group consisting of alcohol, ketone, aromatic hydrocarbon, aliphatic hydrocarbon, alycrylic hydrocarbon, chlorinated hydrocarbon, or a mixture of at least two of these organic solvents.

11. A method of manufacturing a ceramic coned disk or leaf spring, comprising the steps of:
    preparing a mixture by mixing together ceramic powder, organic materials including at least a binder and a plasticizer for imparting formability to the ceramic powder, and a first solvent;
    shaping the mixture into a sheet-like product;
    drying the sheet-like product to remove substantially all of the first solvent from the sheet-like product;
    immersing the dried product in a bath of a second solvent which dissolves a plasticizer contained in the sheet-like product and which is a poor solvent to the binder to that it softens the binder but does not dissolve the binder, for thereby plasticizing the product;
    re-shaping the plasticized sheet-like product into a coned disk or leaf spring; and
    drying the re-shaped coned disk or leaf spring product to remove second solvent therefrom, whereby shrinkage of the re-shaped product is substantially negligible during the removal of the second solvent.

12. The method according to claim 11, further comprising the steps of:

burning organic components contained in the re-shaped product, and sintering the re-shaped product.

13. The method according to claim 11, wherein said organic materials further includes a dispersing agent.

14. The method according to claim 13, wherein said binder comprises at least one element selected from the group consisting of methylcellulose, polyvinyl alcohol, water-soluble urethane, a copolymer of polymethacrylate, polyvinyl butyral, polyacrylate, and polymethacrylate.

15. The method according to claim 11, wherein said second solvent is an organic solvent selected from the group consisting of alcohol, ketone, aromatic hydrocarbon, aliphatic hydrocarbon, alycrylic hydrocarbon, chlorinated hydrocarbon, or a mixture of at least two of these organic solvents.

* * * * *